United States Patent [19]

Göstahagberg et al.

[11] Patent Number: 5,019,812

[45] Date of Patent: May 28, 1991

[54] ELECTRONIC LOCKING SYSTEM

[75] Inventors: Anders P. Göstahagberg, Kungsbacka; Evan A. Knutsson, Jämj ösl ätt; Mats O. G. Nyström, Gothenburg, all of Sweden

[73] Assignee: AB Volvo, Gothenburg, Sweden

[21] Appl. No.: 36,676

[22] PCT Filed: Jun. 27, 1986

[86] PCT No.: PCT/SE86/00316

§ 371 Date: Feb. 27, 1987

§ 102(e) Date: Feb. 27, 1987

[87] PCT Pub. No.: WO87/00234

PCT Pub. Date: Jan. 15, 1987

[30] Foreign Application Priority Data

Jul. 1, 1985 [SE] Sweden ............................... 8503257

[51] Int. Cl.[5] ............................................. B60R 25/04

[52] U.S. Cl. ............................... 340/825.31; 361/172; 235/382.5; 340/542

[58] Field of Search ............................ 340/825.31, 64; 361/172; 235/382.5

[56] References Cited

U.S. PATENT DOCUMENTS

| | | | |
|---|---|---|---|
| 4,144,523 | 3/1979 | Kaplit | 340/825.31 |
| 4,250,533 | 2/1981 | Nelson | 340/825.31 |
| 4,274,080 | 6/1981 | Brunken | 340/64 |
| 4,342,024 | 7/1982 | Rossi | 340/64 |
| 4,347,545 | 8/1982 | Weishaupt et al. | 361/172 |
| 4,366,466 | 12/1982 | Lutz | 340/64 |
| 4,392,133 | 7/1983 | Lundgren | 340/825.31 |
| 4,438,426 | 3/1984 | Adkins | 340/64 |

FOREIGN PATENT DOCUMENTS

| | | |
|---|---|---|
| 0010084 | 4/1980 | European Pat. Off. . |
| 3005890 | 9/1980 | Fed. Rep. of Germany . |
| 2069207 | 8/1981 | Fed. Rep. of Germany . |
| 2906665 | 7/1985 | Fed. Rep. of Germany . |
| 292891 | 9/1980 | United Kingdom . |

*Primary Examiner*—Donald J. Yusko
*Assistant Examiner*—Michael Horabik
*Attorney, Agent, or Firm*—Harness, Dickey & Pierce

[57] ABSTRACT

An electronic locking system comprises a conventional mechanical lock and a key associated therewith, said key having a built-in code transmitter and receiver, preferably an infrared sensitive photo-detector which cooperates with the code transmitter. The receiver is connected to an electronic control unit which is arranged to register a coded signal emitted from the key and transmitted to the receiver. When the signal is acceptable the electronic control unit is activated. The electronic control unit is provided with a memory element contains no information on any coded signal. After transmission of the coded signal of the associated key the coded signal is stored permanently in the memory element whereafter the electronic control unit will accept only precisely this coded signal in order to be activated.

4 Claims, 1 Drawing Sheet

ELECTRONIC LOCKING SYSTEM

BACKGROUND OF THE INVENTION

The subject invention concerns an electronic locking system which is intended to serve as a theft-protection device.

In order to prevent unauthorized persons from gaining access to premises e.g. through a locked door, increasingly ingenious mechanical locks have been devised which are considerably more difficult to force or pick than locks of earlier types.

In order to avoid the problem of having to create mechanical locks fitted with more and more sophisticated lock combinations, electronic locking devices have been developed in recent years. Such systems are intended for and are used particularly in motor cars and other vehicles. Motor cars present the problem of allowing unauthorized persons to gain access thereto comparatively easily, even when the car is fitted with very advanced door locks. In addition, in most types of cars, the ignition lock, for which one and the same key is usually used to start the motor and to open the door lock, can as a rule be forced very easily and by passed by an unauthorized person, irrespective of the construction of the lock by simply shunt connecting the electric cables. In such cases, the problem therefore is not solved even when the lock is of a non-force type.

From DE Offenlegungsschrift 30 05 890 is known an electronic locking device which is intended to be used in motor cars. The key pertaining to the motor car ignition lock is provided with a transmitter which transmits a coded signal. In addition, the motor car is fitted with an electronic unit comprising a detector designed to receive the coded signal, a decoder means and an electronic coupling means which allows the motor to be started upon registration of an authorized or valid signal.

SUMMARY OF THE INVENTION

The subject invention concerns a further development of an electronic locking system of this general type. The system comprises an electronic control unit as described above and a mechanical lock which may be used in the conventional manner until such a time when the user choses to tie the electronic control unit to a predetermined coded signal which may be transmitted from a transmitter means lodged in the key pertaining to the mechanical lock. This is achieved in accordance with the teachings of the subject invention in that the electronic control unit is provided with a memory element which initially lacks information on any coded signal and which is devised in such a manner that under predetermined conditions after transmission of the coded signal of the key belonging to the lock, said memory element stores the coded signal permanently and thereafter it accepts only this coded signal in order to activate the electronic control unit.

BRIEF DESCRIPTION OF THE DRAWINGS

The invention will be described in closer detail in the following with reference to the embodiments illustrated in the accompanying drawings.

DETAILED DESCRIPTION OF A PREFERRED EMBODIMENT

Figure 1:
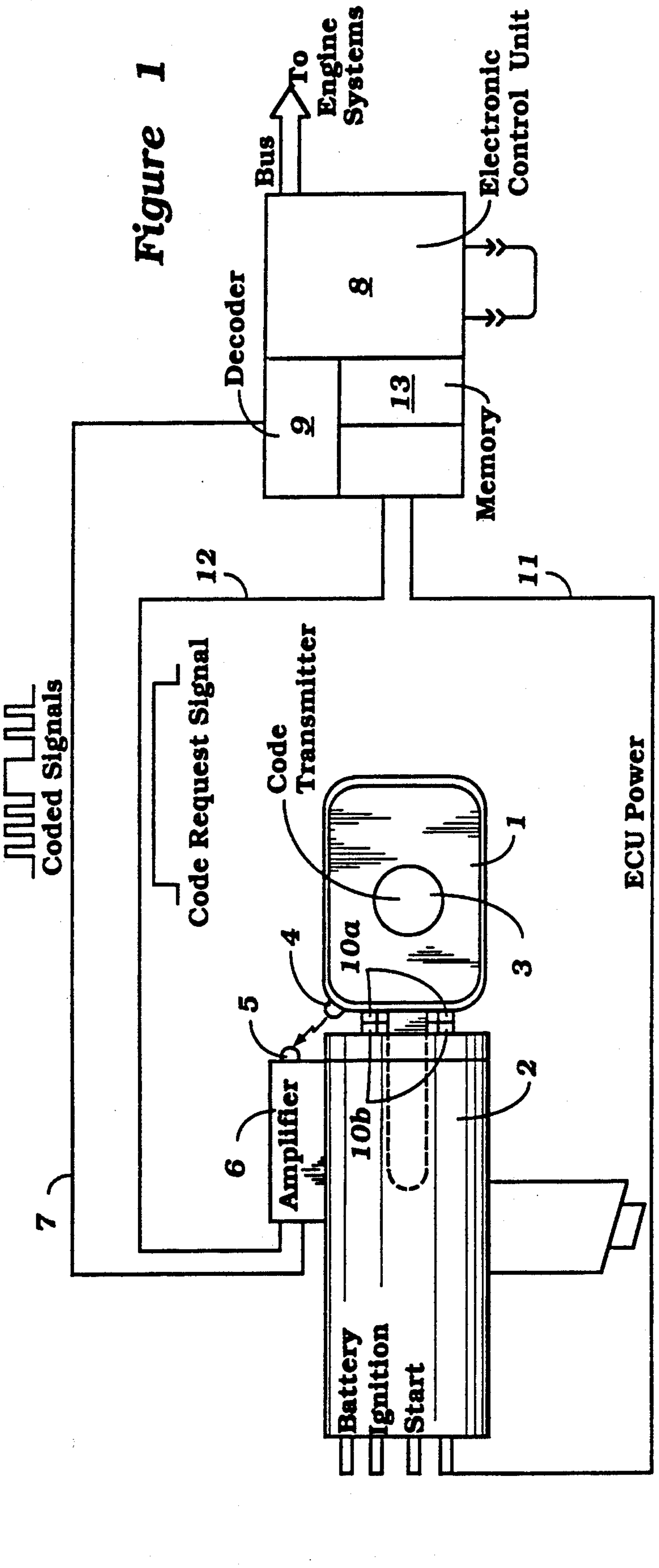
FIG. 1 is a schematic illustration depicting an electronic locking system and a mechanical lock with a key.

The embodiment which is chosen to describe the invention is the ignition lock of a motor vehicle. FIG. 1 illustrates a key 1 fitting the locking cylinder 2 of the ignition lock. The key is provided with a built-in coded signal transmitter 3 with an infrared-light emitting diode 4. On or adjacent the locking cylinder 2 are provided a receiver, a photo-detector 5 connected to a pre-amplifier 6. A wire 7 connects the pre-amplifier 6 with an electronic unit 8 which is intended to control the engine, e.g. ignition, starting or fuel system, and which has a decoder 9 integrated therewith. The key 1 is provided with two electrodes 10*a* for connection to two slip ring contacts 10*b* on the ignition lock 2.

When the key 1 is inserted into the ignition lock 2 and is turned to igniting position battery voltage is supplied to the electronic control unit 8 via a wire 11. This energizes the contacts 10*b* and via a wire 12 a code request signal is made from the electronic control unit 8 to the code signal transmitter 3 of key 1 to transmit a number of coded signals. The code is transmitted to the light-emitting diode and emitted 4 in the form of infrared signals which are received by the photo detector 5 and after amplifiction in the pre-amplifier 6 these signals are transmitted via the wire 7 to the decoder 9 in the electronic control unit 8. The coded signals of the key are compared with a key code which is stored in the memory element 13 in the electronic unit 8. Upon agreement between the code of the signal received and the stored code, the electronic control unit 8 is activated and the engine of the vehicle can be started. Upon lack of agreement, the electronic control unit 8 is not activated.

In accordance with the invention the electronic control 8 is provided with a memory element 13 of a particular kind. Initially, no coded signal is stored in the memory. All electronic units 8 which are mounted in the motor vehicles therefore are absolutely identical originally and consequently the ignition locks may be used in the conventional manner when operated by means of their associated key. The electronic unit 8 is provided with a seal in the form of disabling circuit 15. When this disabling circuit 15 is in position the memory element 13 cannot be programmed and therefore there is no theft protection. As soon as the disabling circuit 15 is broken or cut off, the key code will be stored in the memory element 13 the next time thereafter that the key and ignition lock are used, i.e. when the vehicle is started.

Several advantages are gained by using such general electronic units. As a rule, the manufacturer of the electronic units is not the same as the manufacturer of the ignition locks. Consequently, these components are delivered to the car manufacturing plant from different suppliers. Usually, they are also mounted into the car at different assembly stations along the car assembly line.

The invention presented eliminates a need to correlate the electronic control units with their specific key-lock unit, as would be necessary if they were pre-programmed. Storage of the electronic units also is facilitated because at this stage of the car production they are still universal and therefore not tied to an individual ignition lock.

A further advantage provided by the invention is that should the electronic unit 8 of the vehicle fail after a period of use and not function for some reason it can quite simply be replaced by a fresh universal electronic unit and only after having been mounted in the vehicle will the replacement unit be encoded and tied to the code of the ignition key belonging to this vehicle.

Figure 2:
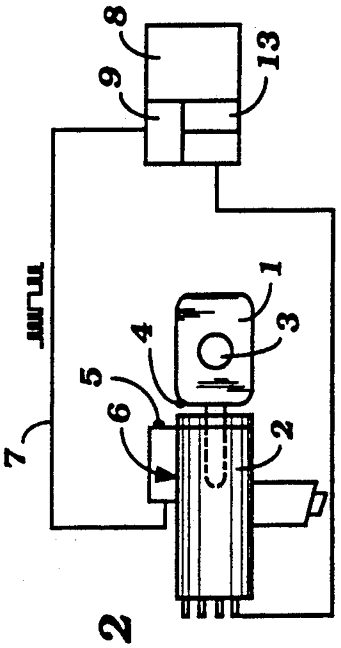
FIG. 2 is a schematic illustration depicting a second embodiment of an electronic locking system and a mechanical lock with a key.

FIG. 2 shows a modification of the embodiment of FIG. 1. The electrodes 10*a*, the slip ring contacts 10*b* and the wire 12 are omitted and instead a battery (now shown) is built into the key 1. The battery supplies the electronic unit 8 with the current required to allow it to receive and register coded signals transmitted from the key 1.

The invention is not limited to use together with the ignition locks in motor vehicles. The electronic locking system could advantageously be used for the ignition locks of motor cycles, motor boats or utility machines and also for instance in premises in which the doors are controlled by electronic units.

What we claim is:

1. An electronic locking system comprising: a conventional mechanical lock and a key for operating said lock, a code transmitter built into said key including means for transmitting coded signals in response to a code request signal when said key is used in said lock, a receiver for receiving coded signals transmitted by said code transmitter, and an electronic control unit connected to said receiver for controlling a select security function, said electronic control unit having means for transmitting code request signal to said code transmitter of said key, memory means for strong a select code signal and means for comparing a code signal received by said receiver with said stored code signal, said electronic control unit activating the select security function when said received coded signal stored therein and including seal means for preventing operation of said select security function unit said seal means has been disabled for permitting normal mechanical lock operations, disabling said seal means being effective to permit said electronic control unit to store a code signal permanently upon the first use of said key in said lock after said seal means has been disabled and when first receiving a coded signal from said receiver, said electronic control unit thereafter activating said security function only when the permanently stored code signal is received from a key used in said lock.

2. The electronic locking system as set forth in claim 1 wherein the means for activating said security function comprises means for switching an electrical circuit.

3. The electronic locking system as set forth in claim 1 comprising means in said lock and said key for transmitting electric power to said key.

4. The electronic locking system as set forth in claim 1 wherein said electronic control unit is pre-programmed to store a coded signal at a preselected occasion.

* * * * *